United States Patent
Henrici et al.

(10) Patent No.: US 9,729,198 B2
(45) Date of Patent: Aug. 8, 2017

(54) CONDITIONING DEVICE AND METHOD FOR CONDITIONING A DATA CHANNEL OF A CELL OF AN ELECTRICAL ENERGY STORE

(71) Applicant: Robert Bosch GmbH, Stuttgart (DE)

(72) Inventors: Fabian Henrici, Stuttgart (DE); Jens Strobel, Freiberg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/402,285

(22) PCT Filed: Apr. 23, 2013

(86) PCT No.: PCT/EP2013/058348
§ 371 (c)(1),
(2) Date: Nov. 19, 2014

(87) PCT Pub. No.: WO2013/174588
PCT Pub. Date: Nov. 28, 2013

(65) Prior Publication Data
US 2015/0146800 A1  May 28, 2015

(30) Foreign Application Priority Data
May 21, 2012 (DE) .......... 10 2012 208 454

(51) Int. Cl.
*H04B 3/54* (2006.01)
*H04Q 9/00* (2006.01)
*H02J 7/00* (2006.01)

(52) U.S. Cl.
CPC ............ *H04B 3/54* (2013.01); *H04Q 9/00* (2013.01); *H02J 7/0021* (2013.01); *H04Q 2209/30* (2013.01)

(58) Field of Classification Search
CPC ... H04B 3/02; H04B 3/03; H04B 3/20; H04B 3/26; H04B 3/28; H04B 3/30; H04B 3/42; H04B 3/487; H04B 3/493; H04B 3/50; H04B 3/54; H04B 3/56; H04Q 9/00;
(Continued)

(56) References Cited

U.S. PATENT DOCUMENTS 5,495,503 A  2/1996 King et al.
2003/0087671 A1*  5/2003 Ruha .................. H04L 25/0264
                                                                        455/557

(Continued)

FOREIGN PATENT DOCUMENTS

DE  10 2010 016 175  8/2011
JP  S62274829 A  11/1987
(Continued)

OTHER PUBLICATIONS

International Search Report for PCT/EP2013/058348, dated Aug. 5, 2013.

*Primary Examiner* — Young T Tse
(74) *Attorney, Agent, or Firm* — Norton Rose Fulbright US LLP; Gerard Messina (57) ABSTRACT

A conditioning device for conditioning a data channel of a cell of a multicell electric energy store is designed to condition a signal frequency, suitable for transmitting data via the data channel, and/or an alternating current resistance of the data channel.

17 Claims, 6 Drawing Sheets

(58) Field of Classification Search
CPC .......... H04Q 2209/30; H04Q 2209/80; H04Q 2209/84; H02J 7/0021
USPC .................. 375/219, 220, 222, 257, 259
See application file for complete search history.

(56) References Cited

U.S. PATENT DOCUMENTS

| | | | |
|---|---|---|---|
| 2008/0123771 A1* | 5/2008 | Cranford | H04L 25/0278 375/285 |
| 2008/0310521 A1* | 12/2008 | Otsuka | H04L 25/028 375/257 |
| 2012/0081138 A1* | 4/2012 | Sul | G01R 31/31716 324/750.3 |
| 2012/0083902 A1 | 4/2012 | Daum et al. | |
| 2013/0281016 A1* | 10/2013 | McFarthing | H04B 5/00 455/41.1 |

FOREIGN PATENT DOCUMENTS

| | | |
|---|---|---|
| JP | H04233337 A | 8/1992 |
| JP | H11-318033 A | 11/1999 |
| JP | 2007201811 A | 8/2007 |
| JP | 2008244761 A | 10/2008 |
| JP | 2010-108909 A | 5/2010 |
| JP | 2011-133418 A | 7/2011 |
| JP | 2012-005058 A | 1/2012 |
| WO | 2009/107597 A1 | 9/2009 |

* cited by examiner

CONDITIONING DEVICE AND METHOD FOR CONDITIONING A DATA CHANNEL OF A CELL OF AN ELECTRICAL ENERGY STORE

BACKGROUND OF THE INVENTION

1. Field of the Invention

The present invention relates to a conditioning device, a communication device, a sensor device, a battery element, a multicell electrical energy store and a method for conditioning a data channel of a cell of a multicell electrical energy store.

2. Description of the Related Art

Published German patent application document DE 10 2010 016 175 A1 describes a battery monitoring and control device.

BRIEF SUMMARY OF THE INVENTION

Against this background, the present invention presents an improved conditioning device, an improved communication device for transmission of data, an improved sensor device, an improved battery element, an improved multicell electrical energy store and an improved method for conditioning a data channel.

Data detected in or on a battery cell, for example, sensor data, may be transmitted via a data channel to a control unit, for example. If the data channel runs across a power supply line of the battery cell or across a housing of the battery cell, then no additional data lines are needed for transmission of the detected data. Sensor signals may thus be detected inside a battery without dedicated data lines, for example, a CAN bus. Instead, an integrated battery sensor having a so-called power line communication, for example, may be used. Conditioning of the data channel may be carried out to ensure error-free communication by power line.

A communication device for transmission of data via a data channel running across a power supply line of a cell of a multicell electrical energy store has the following features:
a first interface for electrically conductive connection of the communication device to a first power supply line of the cell and a second interface for electrically conductive connection of the communication device to a second power supply line of the cell;
a transmission device, which is designed to output data to be transmitted by the communication device using a signal frequency via the second interface, to the data channel; and
a conditioning device for conditioning the data channel.

The multicell electrical energy store may be a battery or a so-called battery pack. For example, it may be a lithium-ion battery for a vehicle, for example, an electric vehicle. The electrical energy store may have a plurality of battery cells or cells, in the form of galvanic or electrochemical secondary cells in particular, as subunits of the energy store. The cells may be high-power cells, including lithium-ion cells in particular. The power supply lines of the cell may be electrical connecting lines of the cell, also called power lines. For example, the first power supply line having a positive terminal or a cathode of the cell and the second power supply line may be electrically conductively connected to a negative terminal or to an anode of the cell. The cell may be electrically contacted via the power supply lines. The communication device may be connected between the power supply lines and thus in parallel to the cell when the interfaces of the communication device are connected to the power supply lines accordingly. The interfaces may be designed as contact points. The data to be transmitted may be data stored or generated within the communication device or data received by the communication device. For example, this may be sensor data of a sensor connected to the communication device. The transmission device may be designed to output to one of the power supply lines via interfaces the data to be transmitted in a form suitable for transmission of data via a power line, for example, to another communication device or to a receiver of a control unit. The transmission device may be designed to modulate the data to be transmitted to the signal frequency or using the signal frequency. The signal frequency may be a carrier frequency, which may be used for transmission of data via the data channel. It may also be a communication frequency at which the data are transmitted via the data channel. A plurality of communication devices may be interconnected via the data channel. For example, the data channel may run to a receiving device of a downstream communication device. If a downstream cell has a low complex impedance with respect to the signal frequency, then the data channel may run through the downstream cell. However, this is undesirable in general. The conditioning device may be connected to the transmission device to condition a transmission characteristic of the transmission device. Additionally or alternatively, the conditioning device may be connected to one or both of the power supply lines to condition a transmission characteristic of the power supply line or lines or the communication device itself.

According to one specific embodiment, the conditioning device may be designed to adjust the signal frequency. For example, the conditioning device may be designed to adjust the signal frequency in response to a reception of a control signal, in response to manual operation of an adjusting device or in response to an analysis of a signal transmitted via the data channel. The signal frequency may be adjusted to a frequency suitable for transmission via the data channel. The suitable frequency may depend, for example, on a resonant frequency or an impedance of one or multiple cell(s) which are or may be connected to the data channel. A preferred frequency range for the signal frequency may be characterized in that within the frequency range there is a resonant exaggeration in the complex cell resistance of the cells of the energy store or in at least one cell of the energy store downstream from the communication device. The conditioning device may be designed to adjust the signal frequency to a value for which a cell, which is or may be connected to the data channel, has a high impedance.

Additionally or alternatively, the conditioning device may be designed to adjust an alternating current resistance between the first power supply line and the second power supply line. For example, the alternating current resistance may be set to a value which represents a high impedance with respect to the signal frequency.

For example, the communication device may have at least one switchable capacitor and, additionally or alternatively, at least one switchable inductor. The conditioning device may be designed to switch the at least one switchable capacitor and, additionally or alternatively, the at least one switchable inductor between the first power supply line and the second power supply line or to isolate them from the power supply lines. In this way, the alternating current resistance between the first power supply line and the second power supply line may be adjusted to a suitable value.

The communication device may have a receiving device, which is designed to receive a signal via the first interface. The conditioning device may be designed to condition the data channel by using the signal. The signal may be a control signal for controlling the conditioning device. The control signal may be supplied by a control unit or another communication device. Furthermore, the signal may be data which are transmitted to the communication device to control the communication device or to be transmitted further by the communication device via the transmission device. The conditioning device may be designed to analyze a signal quality of the data received via the receiving device and to condition the data channel as a function of the signal quality. The conditioning of the data channel may be controlled from the outside in this way as well as being carried out independently.

The conditioning device may be designed to interrupt a data transmission through the conditioning device. The interruption in the data transmission may be accomplished by switching off the communication device or by opening a suitable switch. When the data transmission is interrupted, a communication signal may be prevented from passing through the communication device. Therefore, a transmission of the communication signal via a cell may be tested. To put it more precisely, it is thereby possible to check on whether the communication signal is damped sufficiently by the complex resistance of the cell. Such damping is checkable by, for example, sending the communication signal from a communication device upstream from the interrupted communication device and then analyzing whether the communication signal is received by a communication device downstream from the interrupted communication device. If the communication signal is able to pass through the cell assigned to the communication device, then the signal frequency of the communication signal may be altered with the aid of the conditioning device of the upstream communication device. Additionally or alternatively, capacitive or inductive elements may be connected with the aid of the conditioning device of the interrupted communication device, so that there is a change in the impedance between the power supply lines of the cell having the interrupted communication device.

According to one specific embodiment, the conditioning device may be designed to increase, in a first operating state, an alternating current resistance or the impedance between the first power supply line and the second power supply line with respect to the signal frequency and, in a second operating state, to reduce the alternating current resistance or the impedance with respect to the signal frequency. Additionally or alternatively, the conditioning device may be designed to adjust the signal frequency in the first operating state, in such a way that it is in the range of the resonance increase of the cells, and to adjust the signal frequency in the second operating state in such a way that it is outside of or in a boundary area of the resonance increase of the cells. The first operating state may be a normal operating state in which data are forwarded from communication device to communication device as in a "bucket chain." The second operating state may be an emergency operating state in which data are transmitted very rapidly directly via the cells, bypassing the communication devices. For example, an alarm signal may be transmitted very rapidly due to the direct transmission.

A sensor device for a cell of a multicell electrical energy store has the following features:
a detection device for detecting sensor data with regard to the cell; and
an aforementioned communication device, which is designed to receive the sensor data from the detection device and to generate the data to be transmitted based on the sensor data.

The sensor device may be switched between the power supply lines of the cell. The detection device may be at least one sensor device, one sensor element or the like for detecting at least one state variable of the cell. The state variable may be, for example, a temperature, a voltage or a pressure. The detection device may be designed to output the at least one detected state variable in the form of the sensor data or to provide it in a retrievable form. The transmission device of the communication device may be designed to transmit the sensor data as the data to be transmitted.

A battery element for a multicell electrical energy store has the following features:
a cell of the multicell electrical energy store, the cell having a first power supply line and a second power supply line; and
an aforementioned sensor device, the communication device of the sensor device being electrically conductively connected to the first power supply line via the first interface and electrically conductively connected to the second power supply line via the second interface.

Multiple battery elements may be interconnected in one or multiple line(s) to form the energy store. The sensor device may be used for monitoring the cell. The data detected by the sensor device may be transmitted via one of the power supply lines of the cell. The sensor device may be situated inside or outside of a shell or a housing of the cell. The impedance of the battery element may be altered by the interconnection of at least one capacitor or inductor as described above.

A multicell electrical energy store has the following features:
at least two aforementioned battery elements, which are situated in a series connection or in a parallel connection.

The energy store may be a battery for electric vehicles. The energy store may include one hundred or more cells. All or at least some of the cells may be designed as battery elements. For example, for monitoring the voltage and temperature of the one hundred or more cells, no major cabling effort is required since the power supply lines of the cells are used as one or multiple data channel(s). Instead, an integrated battery sensor may be used, offering a great advantage due to the data, which are transmissible via power line communication, for example, to a central control unit of the energy store. By utilizing the power lines already present between the cells, it is possible to completely omit an individual measuring wiring of the cells.

The multicell electrical energy store may have at least one switching device including a switch and a bridging capacitor wired in parallel to the switch. The switching device may be connected electrically conductively to at least one power supply line of one of the cells of the multicell electrical energy store, and the data channel may run via the bridging capacitor in an opened state of the switch. For example, the switching device may be situated between two adjacent cells. Alternatively, the switching device may be switched in parallel to one or a plurality of cell(s). Furthermore, the switching device may be situated in a power supply line which forms one battery terminal of the energy store. A data transmission within the energy store as well as into the energy store and back out of the energy store may take place in this way, even if the current flow within the energy store is interrupted due to an opened switch of a switching device.

According to specific embodiments of the present invention, it is possible to cause an impedance of the cells to reach a sufficiently high value, in particular due to inductive effects, to isolate the transmission side and the reception side of the cells and thus to isolate the communication devices which are connected to the cells from one another. A suitable choice of the signal frequency for the data transmission within the sensor system is important here. At least one inductor and/or one capacitor may also be switched between the power supply lines of a cell. The data channel may be adjusted with the aid of the conditioning devices, in such a way that a resonance exaggeration of a complex resistance or impedance of the cells is achieved. A good separation may thus be achieved between the input side and the output side or the reception side and the transmission side of the communication device. Through the choice of the signal frequency in the megahertz range in particular, the complex impedance of a cell may advantageously reach high values, for example, values of more than 10 ohm up to far more than 100 ohm or even several thousand ohm. The conditioning device in particular may be designed to generate oscillating circuits, or resonance, at certain frequencies within the battery elements, to achieve a resonance exaggeration in the complex resistance or impedance of the cell. In particular due to the interconnectable inductance and/or capacitance, for example, at least one discrete or integrated capacitor or inductor, the resonance exaggeration may be influenced favorably in a targeted manner. The impedance of the cell may reach a sufficiently high value, in particular due to inductive effects, to isolate the transmission side and the reception side of the communication device from one another. It is thus possible to prevent an input and an output of the communication device to be short-circuited across the cell.

A method for transmitting data via a data channel running across a power supply line of a cell of a multicell electrical energy store includes the following steps:
conditioning the data channel; and
output of data to be transmitted on the data channel using a signal frequency.

Using this method, for example, a method for communication between one or multiple sensor(s) and one or multiple control unit(s) within one battery or multiple batteries is created. It may be a data channel conditioning method for communication among sensors in battery packs.

A device such as that mentioned above may advantageously be used in conjunction with the method for communication. The steps of the method may be implemented by suitable facilities of a suitable device, for example, a communication device.

According to one specific embodiment, the conditioning device may be used separately from the communication device. For example, a first communication device, which has one or no conditioning device, may be situated in a first cell, and one other conditioning device may be situated in a second cell. The conditioning device may be designed to condition the data channel used by the first communication device of the first cell. The conditioning device may therefore be designed to adjust an impedance of the data channel. Additionally or alternatively, the conditioning device may be designed to output an adjustment signal for adjusting a signal frequency used by the first communication device of the first cell for data transmission to the first communication device of the first cell.

A conditioning device for conditioning a data channel of a cell of a multicell electrical energy store is characterized in that the conditioning device is designed to condition a signal frequency suitable for transmission of data via the data channel and, additionally or alternatively, to condition an alternating current resistance of the data channel.

The conditioning device may be used together with a communication device or independently of a communication device. For example, the conditioning device may be situated structurally separated from the communication device whose data channel is being conditioned with the aid of the conditioning device. The data channel may run across a power supply line and/or across a cell housing wall and/or across a battery housing. One of two power supply lines of the cell may be electrically conductively connected to the cell housing wall. The conditioning device may therefore be used not only in a data transmission based on the bucket chain principle, but also in other transceivers. Accordingly, a communication device used for data transmission may have a simple interface to one or multiple power supply line(s) and/or a cell housing or a battery housing.

Accordingly, the conditioning device may be designed to adjust the alternating current resistance of a first power supply line of the cell, a second power supply line of the cell, an electrical connection between the first power supply line and the second power supply line, a cell housing wall of the cell or a battery housing of the multicell electrical energy store.

The conditioning device may therefore have at least one switchable capacitor and/or at least one switchable inductor and may be designed to connect the at least one switchable capacitor and/or at least one switchable inductor to the data channel to condition the alternating current resistance of the data channel.

The conditioning device may have a receiving device, which is designed to receive a signal. The conditioning device may be designed to condition the data channel by using the signal. The signal may be supplied by a control unit or a communication device, for example. The signal may be received via the data channel or via a separate communication channel. The signal may be data transmitted to a communication device via the data channel or data transmitted from a communication device. The conditioning device may be designed to analyze a signal quality of the signal received via the receiving device and to condition the data channel as a function of the signal quality.

The conditioning device may be designed to increase the alternating current resistance with respect to the signal frequency in a first operating state and to reduce the alternating current resistance with respect to the signal frequency in a second operating state.

The conditioning device may be part of a communication device or assigned a communication device.

A communication device for transmission of data via a data channel of a cell of a multicell electrical energy store has the following features:
an interface for electrically conductively connecting the communication device to the data channel;
a transmission device, which is designed to output data to be transmitted from the communication device via the interface to the data channel using a signal frequency; and
a conditioning device for conditioning the data channel.

A corresponding communication device may be used in conjunction with a sensor device. A multicell electrical energy store may have at least one conditioning device connected to a data channel. For example, the energy store may have at least one cell which in turn has a conditioning device.

A method for conditioning a data channel of a cell of a multicell electrical energy store includes the following steps:
conditioning a signal frequency suitable for transmission of data via the data channel and/or an alternating current resistance of the data channel.

A device in the present case may be understood to be an electrical device, for example, an integrated circuit, which processes signals and outputs control signals and/or data signals as a function thereof. An interface of the device may be implemented in hardware and/or in software. In a hardware design, the interface may be part of a so-called system ASIC, for example, which includes a wide variety of functions of the device.

The present invention is explained in greater detail as an example on the basis of the accompanying drawings.

DETAILED DESCRIPTION OF THE INVENTION

In the following description of preferred exemplary embodiments of the present invention, the same or similar reference numerals are used for the elements illustrated in the various figures and those which have a similar effect, so a repeated description of these elements is dispensed with.

Figure 1:
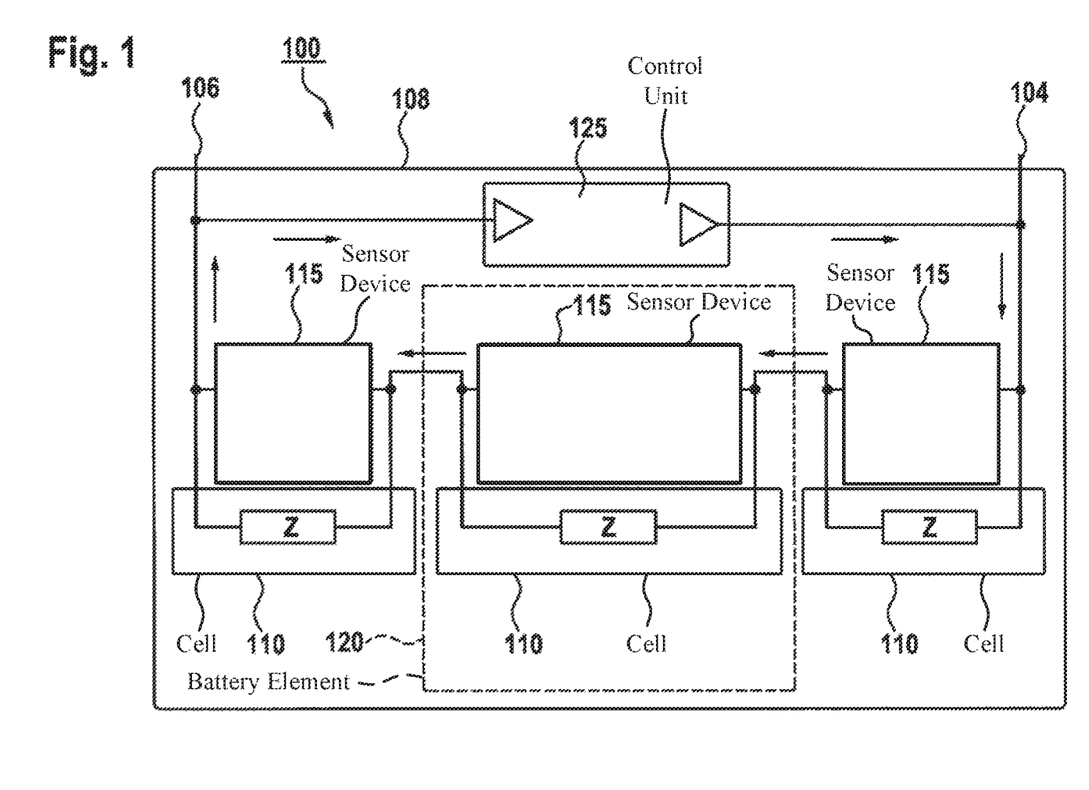
FIG. 1 shows a schematic diagram of a multicell electrical energy store according to one exemplary embodiment of the present invention.

FIG. 1 shows a schematic diagram of a multicell electrical energy store 100 according to one exemplary embodiment of the present invention. The energy store may be a battery. Energy store 100 has a first battery terminal 104 and a second battery terminal 106, which extend out of a housing 108 of energy store 100. Energy store 100 has a plurality of cells 110, also called battery cells, which are interconnected via their power supply lines in a series connection between battery terminals 104, 106. Each of cells 110 has an impedance Z. A sensor device 115 is assigned to each of cells 110. A composite of a cell 110 and a sensor device 115 is referred to as a battery element 120. Energy store 100 thus has a series connection, namely three battery elements 120 according to this exemplary embodiment. Energy store 100 also has a control unit 125, which is connected between the battery terminals 120 and is thus connected in parallel with the series connection of battery elements 120.

A sensor device 115 of a cell 110 is connected in parallel to cell 110 between the power supply lines of cell 110. Sensor devices 115 each have a detection device, for example, a sensor or a measuring unit, for detecting at least one physical property of assigned cell 110 and a communication device for transmitting data, for example, sensor data detected with respect to cell 110. The communication devices may each have, for example, one receiving device and one transmission device. Data may be transmitted via the transmission device and may be transmitted via a power supply line to a downstream sensor device 115. Data transmitted via a power supply line may be received from an upstream sensor device 115 via the receiving device. The receiving device and the transmission device of a communication device may be interconnected via a shift register, for example.

Control unit 125 may be designed to transmit control data to sensor devices 115. The control data may be forwarded from sensor device 115 to sensor device 115. In response to the control data, sensor devices 115 may transmit detected sensor data or may condition data channels which run through the power supply lines for transmission of data. Data transmitted by a sensor device 115 may be forwarded to control unit 125 via downstream sensor devices 115. Control unit 125 may be connected to a central control device situated outside of energy store 100.

In one possible implementation variant of the method, sensor devices 115 or control unit 125 and one sensor device 115, either in proximity to one another or spaced a distance apart, may communicate with one another during operation. A communication may run in one direction, as indicated by the direction of data flow represented by the arrows, for example. In other words, a datum, for example, a single bit, is transmitted by control unit 125 to a first downstream sensor device 115, this sensor device 115 then transmits the bit to second sensor device 115 and this second sensor device 115 in turn transmits the bit to third sensor device 115 which transmits the bit again to control unit 125. Therefore this forms a bucket chain, so to speak, in which bits are transmitted from control unit 125 through sensor devices 115 and back to control unit 125. Multiple successive bits may represent one data word, which includes, for example, a sensor address and/or a command and/or a data packet including communication data. Bits received with the aid of a control device may be modified and/or added in each sensor device 115 before the data word is transmitted further. Thus a logically bidirectional communication link may be established among sensor devices 115 and control unit 125. Communication may also take place in alternating directions.

Various suitable communication methods and communication protocols may be used for communication between control unit 125 and sensor devices 115. For example, sensor devices 115 may be provided with unambiguous addresses, and control unit 125 may be designed to address one or multiple sensor device(s) 115 via the unambiguous addresses. In response to being addressed by control unit 125, addressed sensor device(s) 115 may be designed to transmit communication data to control unit 125. Sensor devices 115 may be designed to transmit communication data to control unit 125 without being addressed by control unit 125. For example, one sensor device 115 may be designed to transmit detected communication data to control unit 125 as a function of sensor data detected by sensor device 115, for example, as a function of a trend or a value of detected sensor data. For example, one sensor device 115 may be designed to transmit an emergency message to control unit 115 while ignoring other stored or received communication data.

To permit data transmission between adjacent sensor devices 115, it is necessary for cells 110 not to represent a short-circuit connection with regard to the data channel via which the data are to be transmitted. In other words, transmitting the data to be transmitted through cells 110 and thus being able to bypass sensor devices 115 should be avoided. Therefore, either the signal frequency, for example, the carrier frequency of the data to be transmitted, may be adapted to impedance Z of cells 110 or a total impedance, including impedance Z, of cells 110 and the impedance of elements of sensor devices 115, for example, of capacitors or inductors are switched between the power supply lines of a cell, so that the data to be transmitted are not transmitted through cells 110.

Figure 2:
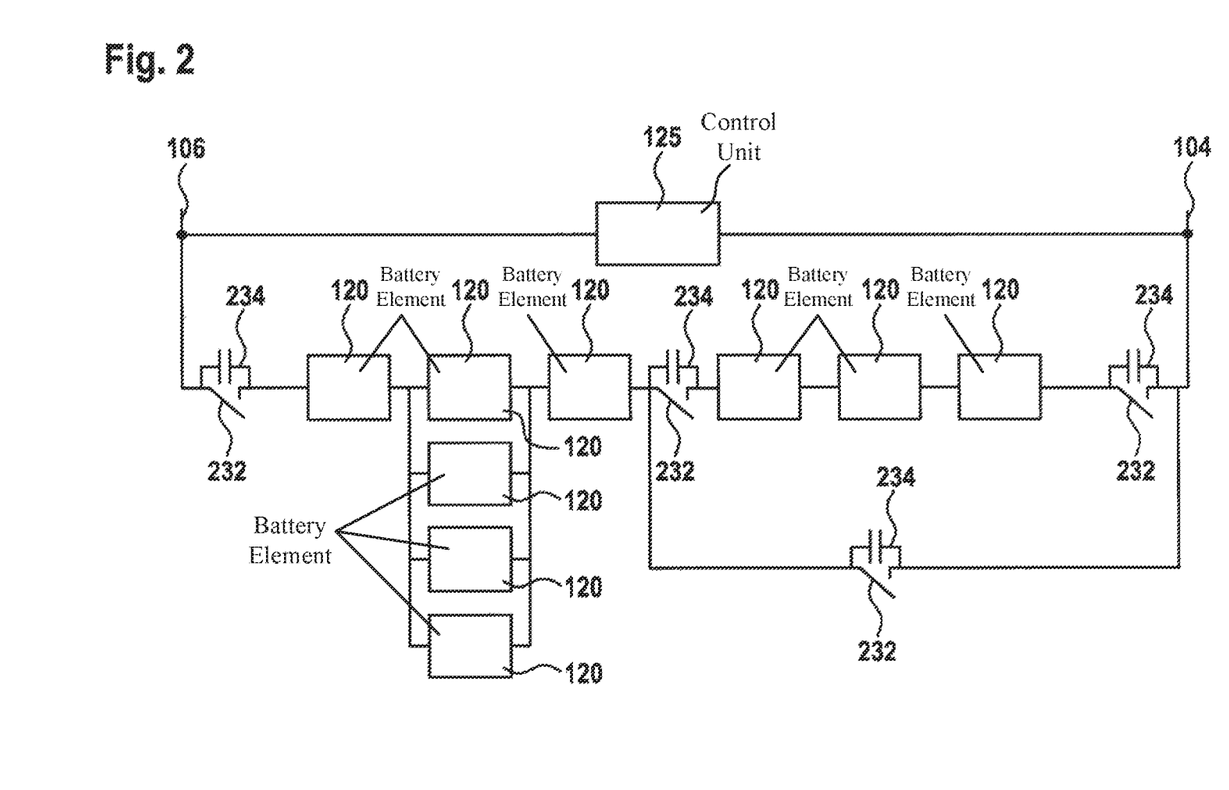
FIG. 2 shows a schematic diagram of a multicell electrical energy store according to one exemplary embodiment of the present invention.

FIG. 2 shows a schematic diagram of a multicell electrical energy store according to one exemplary embodiment of the present invention. The energy store has a plurality of battery elements 120 described on the basis of FIG. 1. According to this exemplary embodiment, the plurality of battery elements 120 is situated in a series connection of six battery elements 120, for example, three additional battery elements 120, for example, being connected in parallel to one of battery elements 120. In a deviation from the exemplary embodiment shown here, an arbitrary combination of series connection and parallel connection of an arbitrary number of battery elements 120 may be implemented.

The energy store has a plurality of switching devices, each of which has a switch 232 and a bridging capacitor 234 connected in parallel to switch 232. The switching devices are situated in power supply lines of the cells of individual ones of battery elements 120. A switching device is situated in a bridging line for bridging a series connection of three of battery elements 120. Individual ones or all of battery elements 120 may be activated or deactivated by the switching devices, i.e., inserted into or removed from an electric circuit by the energy store. If a switch 232 of a switching device or multiple switching devices is opened, then a direct current flow via the respective switching device is interrupted, but data transmitted with a suitable signal frequency, for example, in the megahertz range, may pass through the respective switching device via respective capacitor 234. Capacitors 234 may be, for example, condensers or parasitic capacitances of switches 232.

Figure 3:
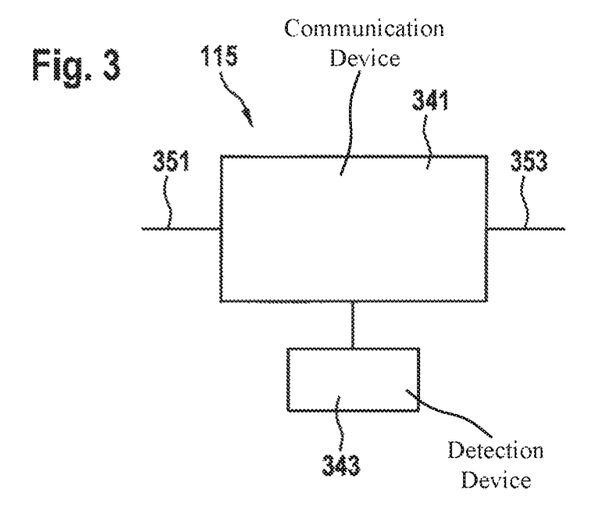
FIG. 3 shows a schematic diagram of a sensor device for a cell of a multicell electrical energy store according to one exemplary embodiment of the present invention.

FIG. 3 shows a schematic diagram of a sensor device 115 for a cell of a multicell electrical energy store according to one exemplary embodiment of the present invention. Sensor device 115 may be used in conjunction with the energy store shown in FIG. 1, for example.

Sensor device 115 has a communication device 341 and a detection device 343. Communication device 341 has a first interface 351, for example, in the form of a first connecting line for connecting communication device 341 to a first power supply line and a second interface 353, for example, in the form of a second connecting line for connecting communication device 341 to a second power supply line of the cell of the energy store. Detection device 343 is designed to detect a physical variable, such as a pressure or a temperature of the cell, for example, and to supply a corresponding sensor value to communication device 341. For example, detection device 343 may be designed to supply a sensor value to a transmission device, a control device or a memory device of communication device 341, and communication device 341 may be designed to transmit the sensor value as data to be transmitted via one of interfaces 351, 353.

Figure 4:
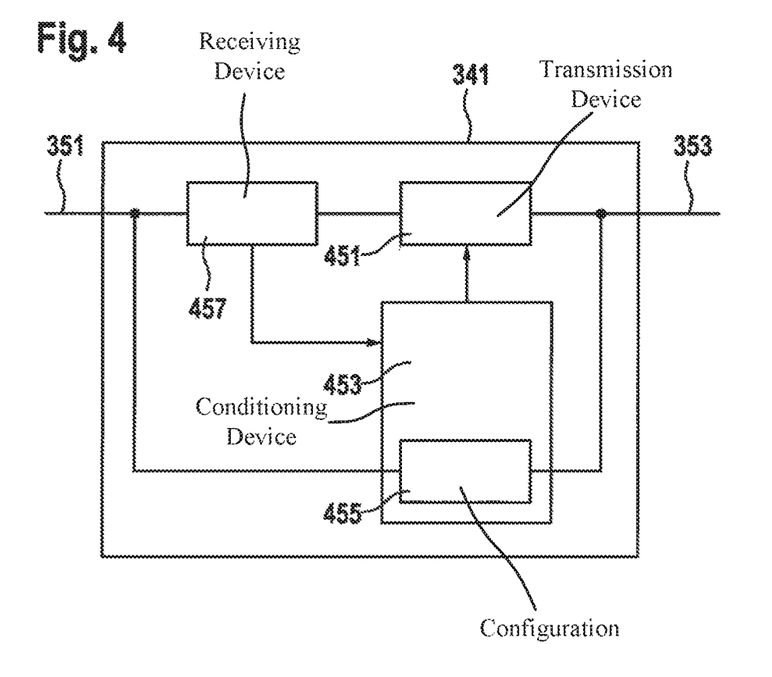
FIG. 4 shows a schematic diagram of a communication device according to one exemplary embodiment of the present invention.

FIG. 4 shows a schematic diagram of a communication device 341 for transmission of data via a data channel running across a power supply line of a cell of a multicell electrical energy store, according to one exemplary embodiment of the present invention. Communication device 341 may be used in conjunction with sensor device 115 described with reference to FIG. 3, for example.

Communication device 341 has a first interface 351 for electrically conductively connecting communication device 341 to a first power supply line of a cell and a second interface 353 for electrically conductively connecting communication device 341 to a second power supply line of the cell. Furthermore, communication device 341 has a transmission device 451 and a conditioning device 453.

Transmission device 451 is designed to output data to be transmitted by communication device 341 to the data channel via second interface 353 using a signal frequency. Conditioning device 453 is designed to condition the data channel.

According to one exemplary embodiment, conditioning device 453 is designed to alter the signal frequency used by transmission device 451. For this purpose, conditioning device 453 may be designed to alter a setting of a frequency generator for generating the signal frequency, for example.

According to another exemplary embodiment, conditioning device 453 is designed to alter a complex impedance between interfaces 351, 353 with respect to the signal frequency. For this purpose, conditioning device 453 may include a configuration 455 of at least one switchable capacitor and, additionally or alternatively, at least one switchable inductor, which may be electrically conductively connected to interfaces 351, 353 or may be disconnected from interfaces 351, 353. Configuration 455 may have a plurality of switchable capacitors and switchable inductors which may be switched in a suitable wiring connection, which includes series connections and parallel connections between interfaces 351, 353, for example.

According to one exemplary embodiment, conditioning device 453 is designed to reduce the complex impedance between interfaces 351, 353 with respect to the signal frequency. The data to be transmitted may be transmitted directly via the cells in this way, bypassing communication device 341. This permits a very rapid data transmission. For example, conditioning device 453 may be designed to reduce the complex impedance in response to receiving an emergency signal. The emergency signal may be a signal generated by the control unit of the energy store, a communication device of the energy store or a detection device assigned to the communication device.

According to one exemplary embodiment, communication device 341 has a receiving device 457. Receiving device 457 is designed to receive data arriving at first interface 351.

For example, the received data may be forwarded by receiving device 457 to transmission device 451 and transmitted by transmission device 451. Furthermore, the received data may be used to control conditioning device 453. For example, conditioning device 453 may be designed to carry out the conditioning of the data channel in response to the received data. The conditioning carried out by conditioning device 453 may thus be controlled by a central location, for example, by a control unit. Conditioning device 453 may also have an evaluation device for evaluating a signal quality of a signal transmitted via the data channel or may be designed as a measuring device for measuring the same in order to carry out the conditioning as a function of the analyzed or measured signal quality.

Communication device 341 may have another interface to a detection device, as described on the basis of FIG. 3.

Figure 5:
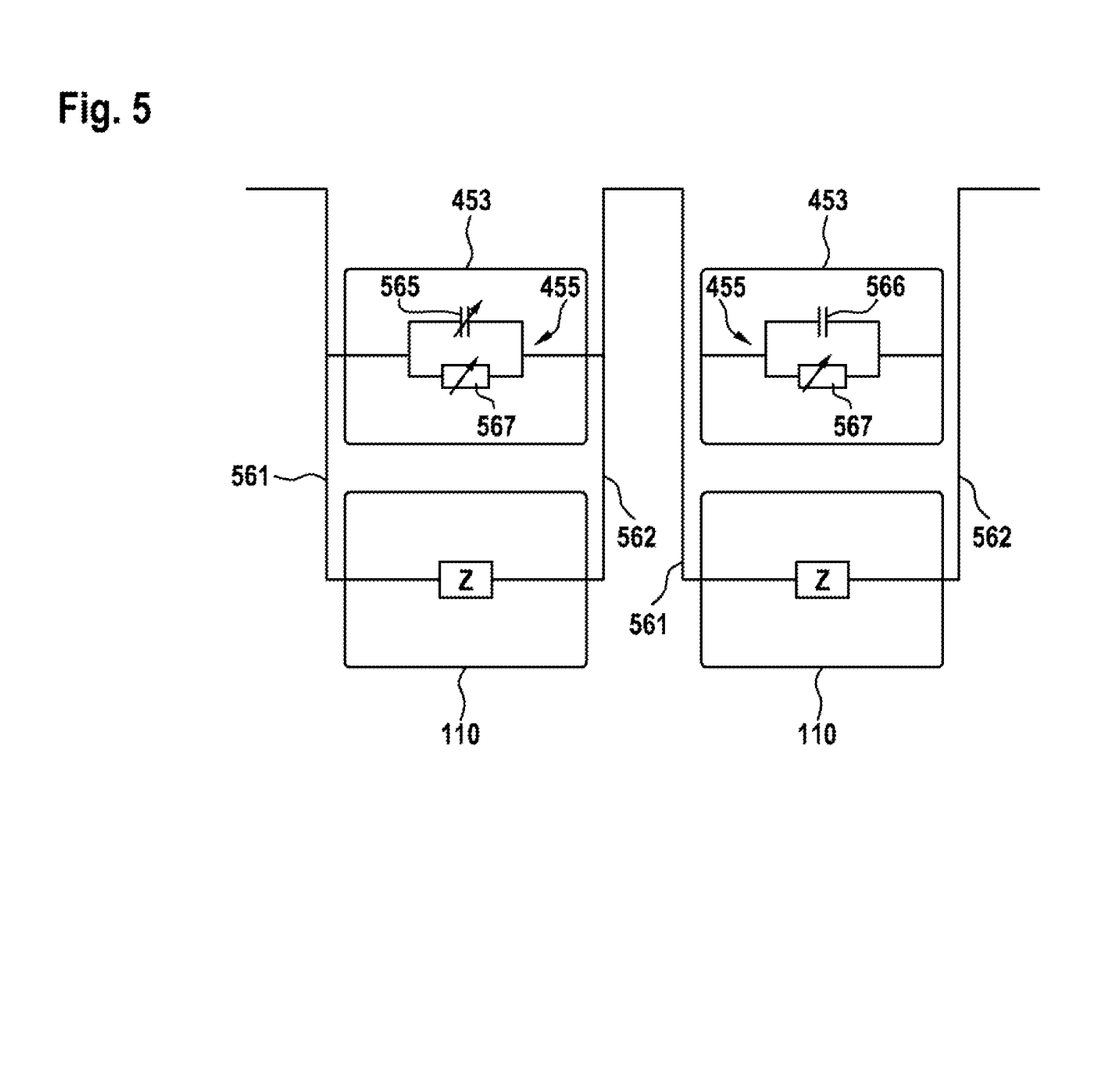
FIG. 5 shows a series connection of two cells of a multicell electrical energy store according to one exemplary embodiment of the present invention.

FIG. 5 shows a series connection of two cells 110 of a multicell electrical energy store, as described on the basis of FIG. 1, for example, according to one exemplary embodiment of the present invention. Cells 110 each have a first power supply line 561 and a second power supply line 562. Second power supply line 562 of cell 110 shown at the left is electrically conductively connected to first power supply line 561 of cell 110 shown at the right. Power supply lines 561, 562 may function as terminals of the energy store or as a power cell connection, depending on the configuration within the energy store. Each of cells 110 has a complex internal resistance Z between respective power supply lines 561, 562.

A conditioning device 453 including a configuration 455 having a capacitor 565, 566 and an inductor 567 is connected between power supply lines 561, 562 of cells 110. Conditioning device 453 may be implemented as part of a sensor device or a communication device or as an independent unit.

A capacitance value of capacitor 565 is adjustable like an inductance value of inductor 567. Capacitor 566 of configuration 455 shown at the right is designed as a fixed capacitor having a permanently adjusted capacitance value, in contrast with capacitor 565. Configurations 455 may each include a field, a so-called array of capacitors 565, 566 and inductors 567, which may be integrated into an integrated circuit, for example, an ASIC, or may be designed discretely.

According to one exemplary embodiment, capacitors 565, 566 and inductors 567, controlled by a control device of conditioning device 453, for example, or by a control device situated externally to conditioning device 453, may be altered in their value for an impedance adjustment. Furthermore, connections between terminals of capacitors 565, 566 and inductors 567 among one another or with the power supply lines 561, 562 may be separated or closed, controlled by a corresponding control device, for example. Additional complex resistances may be implemented between power supply lines 561, 562 of a cell 110 in this way, in addition to complex internal resistance Z of cells 110, being combined to form the resulting total resistances together with complex internal resistances Z of cells 110. The resulting total resistance may be set in such a way that data transmitted via power supply lines 561, 562 of cells 110 at a predetermined or adjustable signal frequency are not transmitted through cells 110.

The circuit shown in FIG. 5 may thus be interpreted as a schematic diagram of a signal conditioning device.

Figure 6:
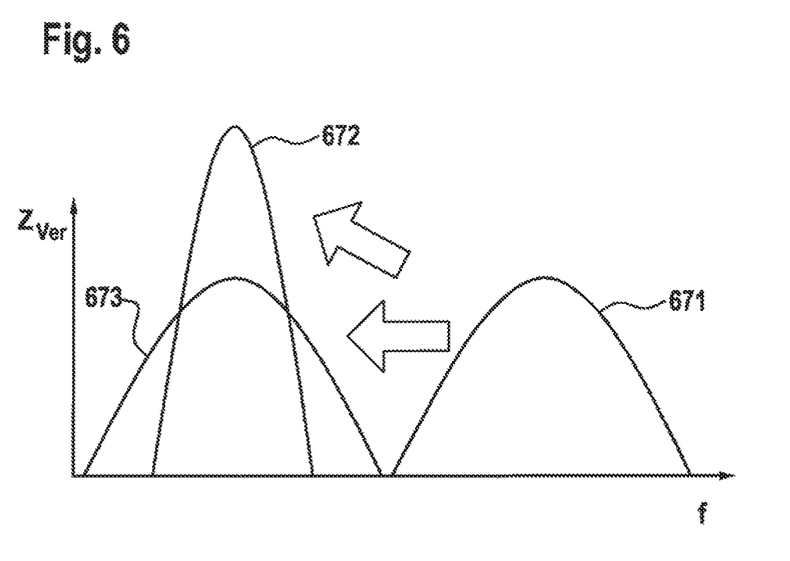
FIG. 6 shows a diagram of a conditioning of a complex impedance of a composite of a cell and a battery sensor according to one exemplary embodiment of the present invention.

FIG. 6 shows, on the basis of a diagram, a conditioning of a complex impedance of a composite of one cell and a battery sensor according to one exemplary embodiment of the present invention. The composite may be, for example, a composite such as that described with reference to FIG. 5. Frequency f is plotted on the abscissa and impedance $Z_{Ver}$ of the composite is plotted on the ordinate.

This shows a starting curve 671, a second curve 672, which represents an increase in quality due to a first conditioning, and a third curve 673, which represents a reduction in the mid-frequency due to a second conditioning. A combination of curves 672, 673 is also achievable through a suitable further conditioning.

Exemplary embodiments of the present invention are also described below with reference to the preceding figures.

One exemplary embodiment includes the design of a battery sensor 115 having a communication interface 341 and a battery containing such sensors 115. Communication interface 341 is designed to carry out a conditioning of the data channel, i.e., the path of the data to and from sensors 115 and control unit 125 via battery elements 120.

The communication takes place via a serial and parallel connection, which is long, if necessary, of battery cells 110, typically one hundred cells 110, for example, sensors 115, including their communication devices 341 being connected in parallel to battery cells 110. Impedance Z of battery cells 110 and the impedances of sensors 115 resulting from the geometric configuration and wiring may vary, depending on the design and selection of battery cells 110 and may change due to additional influencing factors such as aging processes of battery cells 110 and temperature effects.

If the complex resistance, impedance Z, of cells 110 is too low in the selected frequency range of the communication, then, initially, receiver unit 457 or receiving device and/or transmitting unit 451 or transmission device of battery sensor 115 may be "short-circuited" and the signal energy may also be passed by sensor 115 across resistor Z. The latter is a disadvantage in particular for the characterization of a serial power line communication. Data communication is impossible or inadequate in the two cases of inadequate cell impedance Z mentioned above.

Fundamentally, the conditioning method described here, which may be implemented by communication device 341 described here, for example, may use a combination of multiple methods mentioned below to optimize a data transmission via power supply lines 561, 562 of cells 110. Alternatively, also just one of the methods may be applied or implemented.

A first conditioning method is based on a signal frequency adjustment. An adjustment of the signal frequency of the data to be transmitted, i.e., the communication frequency or the carrier frequency, for example, is carried out, so that the signal frequency falls in a range of the resonance exaggeration of complex cell resistance Z of cells 110 or of battery elements 120. The signal frequency may be defined in a fixed manner during the design or installation, but tracking and online optimization may also be provided. According to one exemplary embodiment, a preferred frequency range for the signal frequency is thus in the range of 10 MHz to 100 MHz or from 10 MHz to 200 MHz, since the resonance exaggeration occurs here at typical geometries of prismatic high-energy cells 110.

Differences in resonance frequencies of individual cell impedances Z are to be expected in particular with a larger number of battery cells 110 and a complex wiring of cells 110 in battery 100, so a multi-frequency or broad-band signal frequency band may be advantageous for the signal frequency here.

A second conditioning method is based on the use of connectable elements 455 in the form of discrete or integrated capacitors 565, 566 or inductors 567 in sensor 115 to have a targeted positive influence on the resonance exaggeration in their mid-frequency and quality. Such an influence is schematically shown in FIG. 6. The technical implementation of this is schematically shown in FIG. 5 by the example of a battery 100, which includes two cells 110, this example being applicable also for batteries 100 including more cells 110. Fields 455 of capacitors 565, 566 and inductors 567 may be connected to cell terminals of cells 110 by switches via power supply lines 561, 562. Various combinations of inductor 567 and capacitors 565, 566 in serial connection may be generated due to the design as a field. As an alternative to a field 455 having many adjustment options, a single fixed capacitor 566 may also be used, for example, or other combinations of at least one inductor 567 and, additionally or alternatively, at least one capacitor 565, 566. The effective complex resistance $Z_{Ver}$ which is optimal for the selected communication method, between power supply lines 561, 562 connected to the cell terminals and between battery terminals 104, 106 may be adjusted via parallel and serial resonance in combination and in interaction with fields 455 of additional sensors 115 installed in battery 100 and complex impedance Z of intrinsic cell 110 and the complex impedances of additional cells 110 installed in battery 100.

The first and the second conditioning methods may also be used at the same time to achieve an optimal approach, for example, with regard to the energy consumption and the signal-to-noise ratio.

With a precise knowledge and, additionally or alternatively, a precise measurement and available methods of regulating the resonant frequency, the highest possible quality of this resonance exaggeration may advantageously also be selected according to one exemplary embodiment. If there is no possibility of regulating the resonant frequency, the design is based on an adequate broadband capacity of the resonance exaggeration and thus a lower quality of the resonant circuit to take into account any shifts that might occur in the resonant frequency due to a change in impedance Z of cell 110 due to influences such as aging or temperature effects.

Battery sensor 115 may include a circuit for measuring the signal quality to control the signal frequency and, additionally or alternatively, configurations 455.

According to one exemplary embodiment, in which an implementation of a communication method takes place according to the bucket chain principle, one option of disconnecting communication devices 341 of at least individual ones of sensors 115 is provided. Therefore, the unintentional signal forwarding through cell 110, whose assigned communication device 341 is shut down, may be measured and compensated for. A corresponding measurement may be carried out by a measuring device which may be situated in control unit 125, for example, or in a communication device 341. Based on a measuring result of such a measuring device, the data channel may be conditioned by a change in the signal frequency, for example, or a suitable use of configuration 455, in such a way that unintentional signal forwarding through cell 110 is prevented or at least reduced to a predetermined extent.

In another exemplary embodiment of this type of communication, a targeted reduction in resistance may be provided, whereby a low latency of the signal transmission is possible, for example, in the case of a data transmission of a safety-relevant alarm signal, which is necessary primarily.

Figure 7:
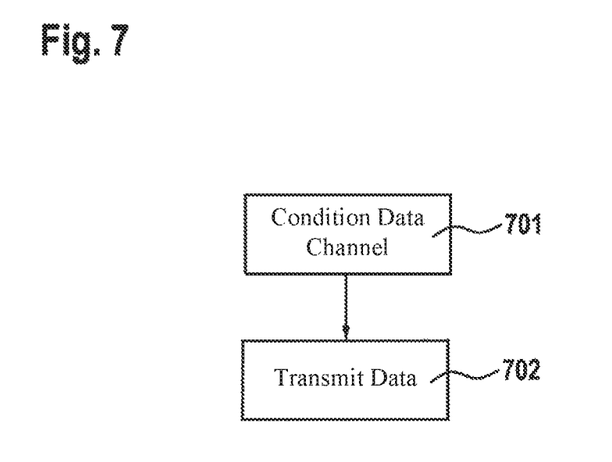
FIG. 7 shows a flow chart of a method for transmitting data via a data channel.

FIG. 7 shows a flow chart of a method for transmitting data via a data channel, which runs across at least one power supply line of a cell of a multicell electrical energy store according to one exemplary embodiment of the present invention. In a step 701, the data channel is conditioned and in a step 702, data to be transmitted are transmitted on the data channel using a signal frequency. Steps 701, 702 may be repeated several times in parallel with one another or in an inverted order. The method may be carried out by a communication device such as that described above, for example. Step 701 may be implemented by implementing a conditioning method, as described above.

Figure 8:
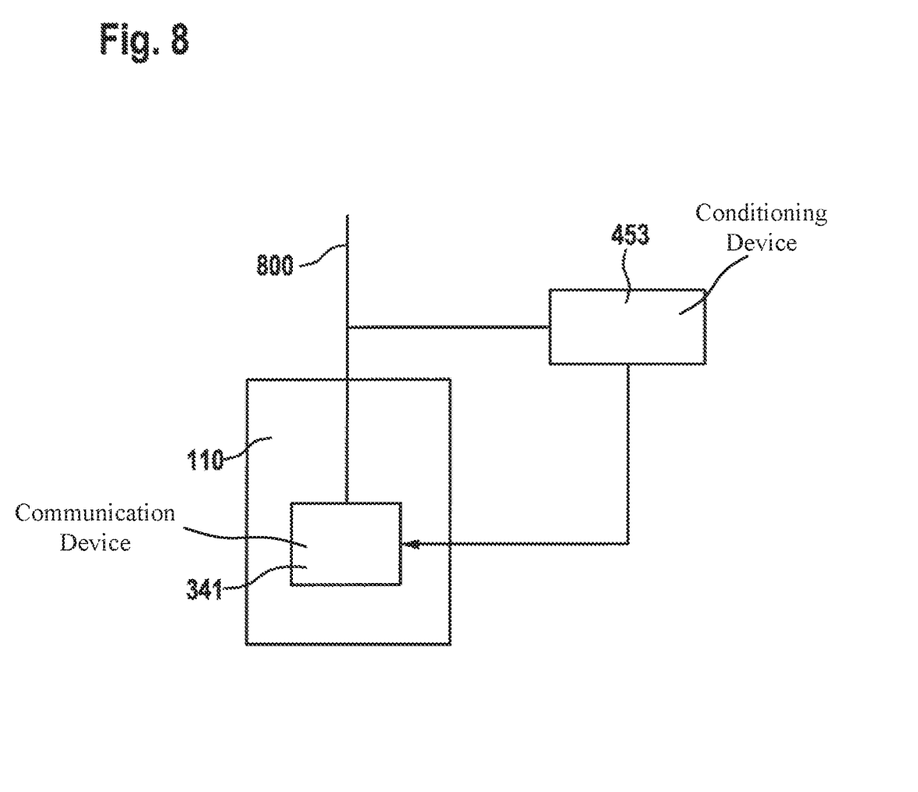
FIG. 8 shows a conditioning device according to one exemplary embodiment of the present invention.

FIG. 8 shows a conditioning device 453 for conditioning a data channel 800 of a cell 110 of a single-cell or multicell electrical energy store according to one exemplary embodiment of the present invention. Data channel 800 may be designed to be unidirectional or bidirectional and may be used by a communication device 341 of cell 110 for data transmission. Data channel 800 may run across one or multiple power supply line(s) or across a housing of cell 110.

Conditioning device 453 may be, for example, part of cell 110, part of communication device 341, part of a communication device of another cell or of a control unit, as shown in FIG. 1, for example, or may be an independent unit. According to the exemplary embodiment shown in FIG. 8, conditioning device 453 is situated spatially separated from cell 110.

According to one exemplary embodiment, conditioning device 453 is designed to adjust a signal frequency, which is used by communication device 341, for data transmission via data channel 800, as already described based on other exemplary embodiments.

For this purpose, conditioning device 453 is designed to output an adjusting signal for setting the signal frequency via an interface to communication device 341.

According to an exemplary embodiment of the present invention, conditioning device 453 is designed to adjust an alternating current resistance of data channel 800, as already described on the basis of other exemplary embodiments. For this purpose, conditioning device 453 may have an electrically conductive connection to a conductor representing data channel 800 and may be designed to connect data channel 800 to at least one element for adjusting the alternating current resistance via the electrically conductive connection. Alternatively, conditioning device 453 may be designed to output a switch signal to a circuit which is connected to data channel 800 for adjusting the alternating current resistance of data channel 800. The circuit may have, for example, at least one connectable capacitor and/or at least one connectable inductor.

Conditioning device 453 may be designed to condition data channel 800 in response to the reception of a control signal or in response to an analysis of a signal transmitted via data channel 800.

The exemplary embodiments shown in the figures are selected only as examples. Different exemplary embodiments may be combined with one another completely or with respect to individual features. One exemplary embodiment may also be supplemented by features of an additional exemplary embodiment. Furthermore, method steps according to the present invention may be carried out repeatedly as well as in any order other than that described here. If one exemplary embodiment includes an "and/or" link between a first feature and a second feature, then this is to be interpreted as meaning that the exemplary embodiment according to one specific embodiment includes both the first feature and the second feature and according to an additional specific embodiment includes either only the first feature or only the second feature.

What is claimed is:

1. A conditioning device for conditioning a data channel of at least one battery cell of a multicell battery, comprising:
   at least one variable electrical element that conditions at least one of (i) a signal frequency suitable for transmission of data via the data channel of the at least one battery cell and (ii) an alternating current resistance of the data channel of the at least one battery cell;
   wherein the at least one variable electrical element includes at least one of a variable capacitor and at least one variable inductor;
   wherein the at least one variable electrical element is electrically connected to a first power supply line of the at least one battery cell of the multicell battery and a second power supply line of the at least one battery cell of the multicell battery, the data channel being carried over at least one of the first power supply line and the second power supply line so that the transmission of the data via the data channel is over the at least one of the first power supply line and the second power supply line.

2. The conditioning device as recited in claim 1, wherein the conditioning device is configured to adjust the alternating current resistance of at least one of the first power supply line of the at least one battery cell, the second power supply line of the at least one battery cell, an electrical connection between the first power supply line and the second power supply line, a cell housing wall of the at least one battery cell, and a battery housing of the multicell battery.

3. The conditioning device as recited in claim 2, wherein the at least one variable capacitor and the at least one variable inductor are configured to be connected to the data channel of the at least one battery cell in order to condition the alternating current resistance of the data channel of the at least one battery cell.

4. The conditioning device as recited in claim 2, wherein a receiving device receives a signal, and wherein the conditioning device conditions the data channel of the at least one battery cell using the signal.

5. The conditioning device as recited in claim 2, wherein the conditioning device is configured to (i) increase the alternating current resistance with respect to the signal frequency in a first operating state and (ii) reduce the alternating current resistance with respect to the signal frequency in a second operating state.

6. The conditioning device as recited in claim 1, wherein the multicell battery is a lithium-ion battery.

7. The conditioning device as recited in claim 1, wherein the at least one battery cell is one of a galvanic secondary battery cell or an electrochemical secondary battery cell.

8. A system for transmission of data via a data channel of at least one battery cell of a multicell battery, comprising:
  an interface for electrically conductively connecting the a communication device to the data channel of the at least one battery cell;
  a transmission device configured to output, to the data channel of the at least one battery cell via the interface, data to be transmitted by the communication device using a signal frequency; and
  a conditioning device for conditioning the data channel, the conditioning device including at least one variable electrical element configured to condition at least one of (i) the signal frequency suitable for transmission of data via the data channel of the at least one battery cell and (ii) an alternating current resistance of the data channel of the at least one battery cell;
  wherein the at least one variable electrical element includes at least one variable capacitor and at least one variable inductor;
  wherein the conditioning device is electrically connected to a first power supply line and a second power supply line of the at least one battery cell of the multicell battery, the data channel being carried over at least one of the first power supply line and the second power supply line so that the transmission of the data via the data channel is over the at least one of the first power supply line and the second power supply line.

9. The system as recited in claim 8, further comprising:
  a detection device for detecting sensor data with regard to the at least one battery cell; wherein the communication device is configured to receive the sensor data from the detection device and generate the data to be transmitted, based on the sensor data.

10. The system as recited in claim 9, wherein the conditioning device is configured to adjust the alternating current resistance of at least one of the first power supply line and the second power supply line.

11. The system as recited in claim 10, wherein at least two battery cells are situated in at least one of a series connection and a parallel connection.

12. The system as recited in claim 8, wherein the multicell battery is a lithium-ion battery.

13. The system as recited in claim 8, further comprising the multicell battery.

14. The system as recited in claim 8, wherein the at least one battery cell is one of a galvanic secondary battery cell or an electrochemical secondary battery cell.

15. A method for conditioning a data channel of a battery cell of a multicell battery, comprising:
  electrically connecting a conditioning device to a first power supply line and a second power supply line of the battery cell of the multicell battery; and
  conditioning, using the conditioning device, at least one of (i) a signal frequency suitable for transmission of data via the data channel of the battery cell, and (ii) an alternating current resistance of the data channel of the battery cell;
  wherein the conditioning device adjusts the alternating current resistance of at least one of the first power supply line of the battery cell, the second power supply line of the battery cell, an electrical connection between the first power supply line and the second power supply line, a cell housing wall of the battery cell, and a battery housing of the multicell battery;
  wherein the conditioning device includes at least one variable electrical element; and
  wherein the at least one variable electrical element includes at least one variable capacitor and at least one variable inductor,
  the data channel being carried over at least one of the first power supply line and the second power supply line so that the transmission of the data via the data channel is over the at least one of the first power supply line and the second power supply line.

16. The method as recited in claim 15, wherein the multicell battery is a lithium-ion battery.

17. The method as recited in claim 15, wherein the battery cell is one of a galvanic secondary battery cell or an electrochemical secondary battery cell.

* * * * *